United States Patent
Chickermane

(10) Patent No.: US 12,430,474 B1
(45) Date of Patent: Sep. 30, 2025

(54) LOCKING MECHANISM AND CORE WRAPPING FOR IP CORE

(71) Applicant: Cadence Design Systems, Inc., San Jose, CA (US)

(72) Inventor: Vivek Chickermane, Slaterville Springs, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 620 days.

(21) Appl. No.: 17/900,212

(22) Filed: Aug. 31, 2022

(51) Int. Cl.
G06F 21/76 (2013.01)
H04L 9/32 (2006.01)

(52) U.S. Cl.
CPC ............ G06F 21/76 (2013.01); H04L 9/3247 (2013.01)

(58) Field of Classification Search
CPC ................................ G06F 21/76; H04L 9/3247
USPC ........................................................ 716/102
See application file for complete search history.

(56) References Cited

U.S. PATENT DOCUMENTS

| | | | | |
|---|---|---|---|---|
| 6,651,225 B1* | 11/2003 | Lin | ................... | G06F 30/331 716/128 |
| 7,058,918 B2* | 6/2006 | Abramovici | ... | G01R 31/318541 716/126 |
| 7,184,946 B2* | 2/2007 | Ballagh | ................... | G06F 30/33 703/22 |
| 7,437,695 B1* | 10/2008 | Ranjan | ................ | G06F 30/3312 703/19 |
| 7,653,849 B1* | 1/2010 | Tabatabaei | ..... | G01R 31/318508 714/733 |
| 7,721,090 B1* | 5/2010 | Deepak | ................... | G06F 21/12 703/15 |
| 7,757,294 B1 | 7/2010 | Simkins | | |
| 8,296,694 B1* | 10/2012 | Chakravadhanula | ....................... | G06F 30/327 716/103 |
| 8,468,244 B2 | 6/2013 | Redlich | | |
| 9,405,700 B2 | 8/2016 | Wingard | | |
| 10,594,668 B1* | 3/2020 | Sanchez | ................ | H04L 63/045 |
| 11,115,396 B1* | 9/2021 | Sanchez | ................ | H04L 63/083 |
| 11,775,723 B1* | 10/2023 | Chen | ..................... | G06F 30/392 716/124 |
| 2006/0271904 A1* | 11/2006 | Emerson | .......... | G01R 31/31704 716/111 |
| 2007/0157134 A1* | 7/2007 | Cheng | ..................... | G06F 30/33 716/106 |
| 2013/0227513 A1* | 8/2013 | Whetsel | ................ | G06F 30/398 716/136 |

(Continued)

FOREIGN PATENT DOCUMENTS

| | | |
|---|---|---|
| EP | 2 590 368 B1 | 7/2016 |
| EP | 3 201 821 B1 | 9/2020 |

Primary Examiner — Suresh Memula
(74) Attorney, Agent, or Firm — Foley & Lardner LLP

(57) ABSTRACT

An integrated circuit (IC) chip includes an intellectual property (IP) core that executes logical operations to perform a function. The IC chip also includes a core wrapper logically encapsulating the IP core such that inputs and outputs to the IP core are funneled through ports of the core wrapper. The IC chip further includes a locking mechanism for controlling communications with the core wrapper. The locking mechanism includes a set of locking elements that gate access to the ports of the wrapper and a lock interface that controls a state of the set of locking elements based on a presence or absence of an authentication key.

20 Claims, 8 Drawing Sheets

(56) References Cited

U.S. PATENT DOCUMENTS

| | | | |
|---|---|---|---|
| 2014/0096097 A1* | 4/2014 | Prasanna | G06F 30/30 |
| | | | 716/107 |
| 2015/0033200 A1* | 1/2015 | Toyama | G06F 30/394 |
| | | | 716/126 |
| 2015/0109024 A1* | 4/2015 | Abdelfattah | H03K 19/017581 |
| | | | 326/41 |
| 2015/0213179 A1* | 7/2015 | Dangat | G06F 30/39 |
| | | | 716/111 |
| 2016/0173104 A1* | 6/2016 | Vassiliev | H03K 19/17704 |
| | | | 716/125 |
| 2023/0114858 A1* | 4/2023 | Ksheerasagar | G06F 30/327 |
| | | | 716/108 |
| 2024/0310437 A1* | 9/2024 | Park | G01R 31/318508 |

\* cited by examiner

LOCKING MECHANISM AND CORE WRAPPING FOR IP CORE

TECHNICAL FIELD

This disclosure relates to an integrated circuit (IC) design. More particularly, this disclosure relates to IC designs with a locking mechanism and a core wrapper for an intellectual property (IP) core.

BACKGROUND

In electronic design a semiconductor IP core, or IP block is a reusable unit of logic, cell or IC chip layout design that is the IP of one party. IP cores may be licensed to another party or can be owned and used by a single party alone. IP cores can be used as building blocks within application-specific integrated circuit (ASIC) designs, field-programmable gate array (FPGA) logic designs or general-purpose processors.

Semiconductor manufacturers have embedded instruments in IC chips to simplify the characterization, testing and debugging of these devices. Given the right standards-based tools environment, these same instruments can perform a much broader spectrum of chip, board and system level validation, test and debug applications.

SUMMARY

One example relates to an IC chip that includes an IP core that executes logical operations to perform a function. The IC chip also includes a core wrapper logically encapsulating the IP core such that inputs and outputs to the IP core are funneled through ports of the core wrapper. The IC chip further includes a locking mechanism for controlling communications with the core wrapper. The locking mechanism includes a set of locking elements that gate access to the ports of the wrapper and a lock interface that controls a state of the set of locking elements based on a presence or absence of an authentication key.

Another example relates to a system that includes a non-transitory memory that stores machine-readable instructions and a processing unit that accesses the memory and executes the machine-readable instructions. The machine-readable instructions include a security engine that augments an integrated circuit (IC) chip design with a locking mechanism for fabrication such that the IC chip design includes a core wrapper logically encapsulating an intellectual property (IP) core such that inputs and outputs to the IP core are funneled through ports of the core wrapper. The locking mechanism controls communications with the core wrapper. The locking mechanism includes a set of locking elements that gate access to the ports of the core wrapper and a lock interface that controls a state of the set of locking elements based on a presence or absence of an authentication key.

Yet another example relates to a method for securing an IC design for fabrication. The method being implemented by a security engine executing on a computing platform. The method includes receiving the IC design. The IC design includes a core wrapper logically encapsulating an intellectual property (IP) core such that inputs and outputs to the IP core are funneled through ports of the core wrapper. The IC design also includes a test access port (TAP) module that provides control signals for controlling a state of the core wrapper. The method also includes augmenting the IC design with a locking mechanism for controlling communications with the core wrapper and the TAP module. The locking mechanism includes a set of locking elements that gate access to the ports of the wrapper and to ports of the TAP module. The locking mechanism also includes a lock interface that controls a state of the set of locking elements based on a presence or absence of an authentication key.

DETAILED DESCRIPTION

Figure 1:
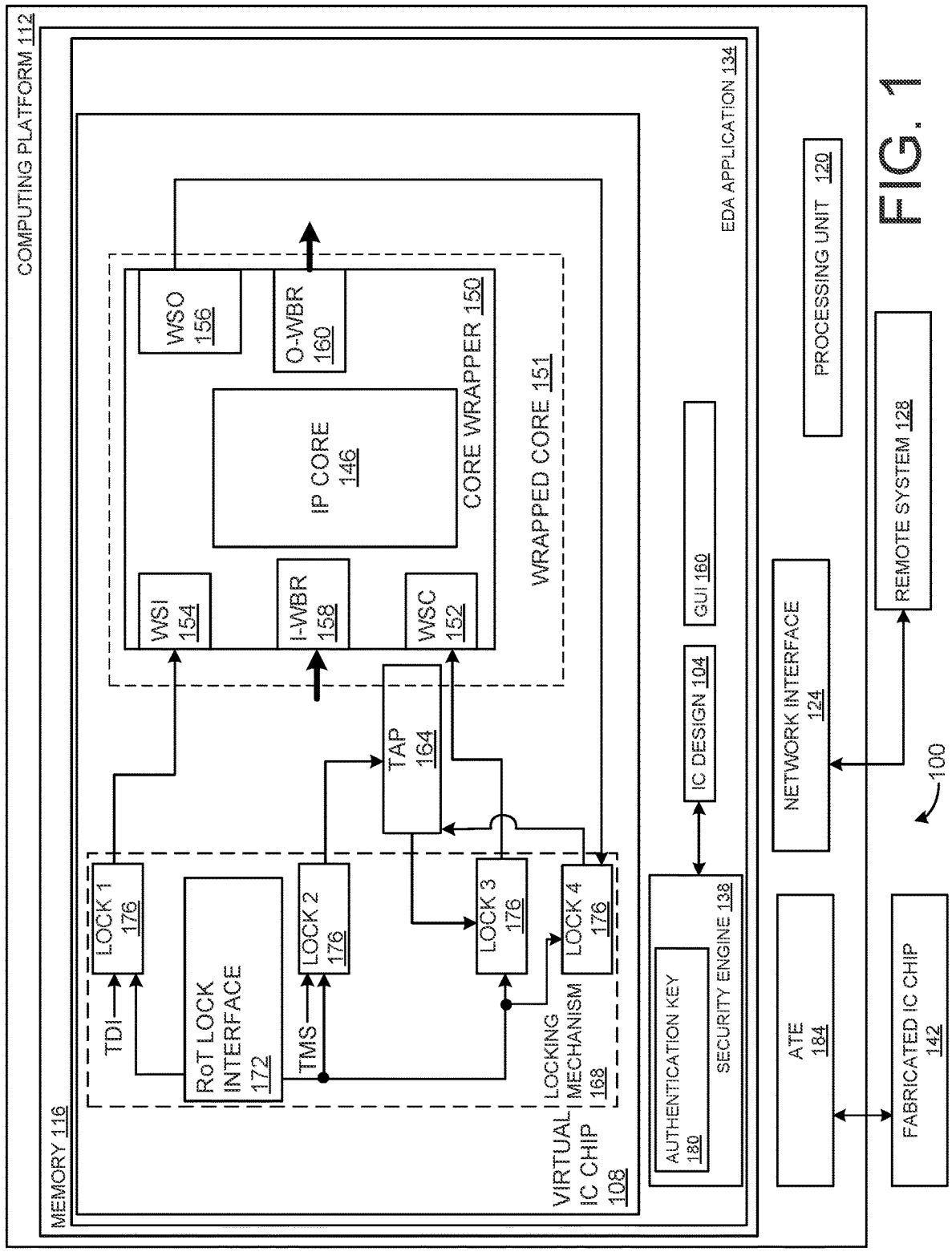
FIG. 1 illustrates an example of a system for augmenting an IC design with a locking mechanism.

This description relates to an IC design that includes an IP core configured to execute a function (or multiple functions). The IC design also includes a core wrapper that logically encapsulates the IP core such that inputs and outputs to the IP core are funneled through ports of the core wrapper. A test access port (TAP) module generates control signals that are provided to the core wrapper to control a mode of operation of the core wrapper. The core wrapper can operate in an inward face (INTEST) mode, an outward facing (EXTEST) mode and a wrapper disable mode. The INTEST mode (e.g., a first mode of operation) is employed for testing the IP core. The EXTEST mode (e.g., a second mode of operation) is employed for testing interconnects between IP cores of the IC design and the wrapper disable mode (e.g., a third mode of operation) that allows unfettered access to the IP core.

The IC design includes a locking mechanism for controlling communications with the core wrapper, and the TAP. The locking mechanism includes a set of locking elements that gate access to the ports of the core wrapper, and a root of trust (RoT) lock interface (alternatively referred to as a lock interface) that controls a state of the set of locking elements based on a presence or absence of an authentication key. In a locked state, the locking elements block data at an input of a given locking element from reaching an output of the given locking element. In an unlocked state, the locking elements operate as a pass through, allowing data at the input of a given locking element to pass to an output of the given locking element.

The RoT lock interface can be implemented with a cryptoprocessor that stores unlocking codes in an internal secure register. In response to receipt of the authentication key (e.g., provided from an RoT or other trusted entity), the RoT lock attempts to authenticate the authentication key. In response to authentication of the authentication key, the RoT interface provides the unlocking codes to the set of locking elements to transition the locking elements from a locked state to an unlocked state. In situations where the RoT lock interface does authenticate the authentication key (e.g., because the authentication key is not provided to the RoT lock interface or an inauthentic key, such as a fraudulent key is provided to the RoT lock interface), the RoT lock interface does not provide the unlock code to the locking elements, such that the locking elements remain in the locked state.

By including the locking mechanism in the IC design, the locking mechanism works in concert with the core wrapper to prevent unauthorized use of the IC design. In particular, the RoT lock interface is configured such that in the absence of the authentication key, the set of locking elements remain in the locked state, thereby blocking input signals from being passed therethrough. Thus, in situations where the authentication key is not provided to the RoT lock interface external signals are block from reaching the TAP module and the core wrapper. Moreover, in some examples, the core wrapper 150 operates in an EXTEST mode by default, such that functional inputs provided to the core wrapper are blocked from reaching the IP core. Additionally, test data encoded in the external signals are blocked from reaching the core wrapper, such that the locking mechanism and the core wrapper operate in concert to prevent unauthorized access to the IP core.

After the IC design is augmented with the locking mechanism, a fabricated IC chip can be instantiated (e.g., fabricated) based on the IC design. In some examples, the fabricated IC chip can be fabricated in an unsecure facility, sometimes referred to as an "untrusted foundry". In such situations, inclusion of the locking mechanism and the core wrapper may curtail IP theft, security information theft, reverse engineering, counterfeiting, etc. because an end-customer that employs the fabricated IC chip would be unable to access the IP core without having access to the authentication key. In this manner, usage of the fabricated IC chip is limited to authorized entities.

FIG. 1 illustrates an example of a system 100 for adding security to an IC design 104 that could be represented as a virtual IC chip 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124 and the memory 116 could be representative of a single instance of hardware or multiple instances of hardware with applications executing across the multiple of instances (i.e., distributed) of hardware (e.g., computers, routers, memory, processors or a combination thereof). Alternatively, the computing platform 112 could be implemented on a single dedicated server or workstation.

The IC design 104 can be stored in the memory 116 of the computing platform 112. The IC design 104 can be implemented, for example, as design specifications for an IC chip. The IC design 104 can be generated with an EDA application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 104. In the examples described, the virtual IC chip 108 represents a simulated instantiation of the IC design 104.

The memory 116 can include an EDA application 134. The EDA application 134 can be, for example a design for test (DFT) EDA application. The EDA application 134 analyzes the IC design 104 to provide the virtual IC chip 108. The EDA application 134 is configured/programmed to augment the IC design 104 with features to enable testing and security to the IC design 104. In particular, the EDA application 134 can include a security engine 138 that is configured to augment the IC design 104 with security features to prevent unauthorized access to a fabricated IC chip 142 that is based on the IC design 104. Unless otherwise stated the virtual IC chip 108 represents a digital twin of the fabricated IC chip 142. That is, it is presumed that the fabricated IC chip 142 includes the same features as those illustrated with respect to the virtual IC chip 108.

More particularly, the virtual IC chip 108 includes an IP core 146 (alternatively referred to as an IP block). While FIG. 1 illustrates a single IP core 146, in many instances, there can be virtually any number of IP cores 146 (e.g., hundreds, thousands or millions). The IP core 146 can represent a logic block that executes a particular function or multiple functions. In some examples, the IP core 146 can be provided by a third-party developer or could be designed by the end-user that generated the IC design 104. In some examples, internal operations of the IP core 146 are known to the end-user. In other examples, such internal operations some (or all) of the IP core 146 are obfuscated.

The IP core 146 is logically encapsulated by a core wrapper 150 forming a wrapped core 151. In some examples, the EDA application 134 adds the core wrapper 150. In other examples, the core wrapper 150 is already present in the IC design 104. The core wrapper 150 can be an IEEE 1500 standard core test access wrapper. IEEE 1500 provides a hardware standard for IP/core-level test access and defines a wrapper to access a core and to provide interface between the core 146 and external components. These external components could be, for example, other modules on the virtual IC chip 108 or could be external modules (e.g., other IC chips). The core wrapper 150 includes ports for communicating with the IP core 146. The core wrapper 150 is configured such that data communicated with the IP core 146 is funneled through ports of the core wrapper 150.

More particularly, the core wrapper 150 includes ports for controlling access to the IP core 146. Specifically, the core wrapper 150 includes a wrapper serial control (WSC) port 152, a wrapper serial input port (WSI) port 154, a wrapper serial output (WSO) port 156, an input wrapper boundary register (I-WBR) port 158 and an output wrapper boundary register (O-WBR) port 160. The WSC port 152 is configured to receive control signals that control a mode of operation of the core wrapper 150. The WSI port 154 is configured to receive test data, and the WSO port 156 is configured to output responses to the serial test patterns. The I-WBR port 158 is configured to receive functional inputs that are applicable to the IP core 146 and the O-WBR port 160 is configured to output functional outputs characterizing responses to the functional inputs.

As noted, the control signals provided to the WSC port control a mode of operation of the core wrapper 150. The core wrapper 150 can operate in an INTEST mode, an EXTEST mode or a wrapper disable mode. During time intervals that the control signal causes the core wrapper 150 to operate in the INTEST mode (e.g., a first mode of operation), the test data to the WSI port 154 are applied to the IP core 146, and responses to the test data generated by the IP core 146 are output at the WSO port 156. Stated differently, the core wrapper 150 routes the TDI signal received at the WSI port 154 of the core wrapper 150 to the IP core 146 (e.g., through the I-WBR port 158) and responses to the TDI signals are output at the WSO port 156. In the INTEST mode, functional inputs applied to the I-WBR port 158 are blocked from reaching the IP core 146.

During intervals of time that the control signals cause the core wrapper 150 to operate in the EXTEST mode (e.g., a second mode of operation), the IP core 146 is bypassed such that the test data applied at the WSI port 154 are passed through to the WSO port 156, and possibly to another IP core (not shown) of the virtual IC chip 108. Stated differently, in the EXTEST mode, the core wrapper 150 routes the TDI signal received at the WSI port 154 of the core wrapper 150 to the WSO port 156 of the core wrapper 150 and bypasses the IP core 146. Also, in the EXTEST mode, the O-WBR port 160 blocks (e.g., gates) functional output signals. The EXTEST mode is used to test the interconnect signals between multiple cores using the core wrapper at one core to launch a test stimuli and measure the response at the receiving core wrapper. The EXTEST mode is employable to detect opens and/or stuck-at defects in the interconnect signals.

During intervals of time that the control signals cause the IP core 146 to operate in the wrapper disable mode (e.g., a third mode of operation), operations of the core wrapper 150 are disabled, such that the functional inputs at the I-WBR port 158 are passed to the IP core 146, and functional outputs generated in response to the functional outputs are output at the O-WBR port 160. Stated differently, in the wrapper disable mode, the core wrapper 150 routes functional input signals received at the I-WBR port 158 of the core wrapper 150 to the IP core 146 and responses to the functional input ports to the O-WBR port 160 of the core wrapper 150.

In the example provided, it is presumed that as a default, the core wrapper 150 operates in the EXTEST mode. That is, unless the control signals provided to the WSC port 152 indicate otherwise, the core wrapper 150 blocks functional input signals at the I-WBR port 158 from reaching the IP core 146. Additionally, the core wrapper 150 forwards test data applied at the WSI port 154 to the WSO port 156.

Figure 2:
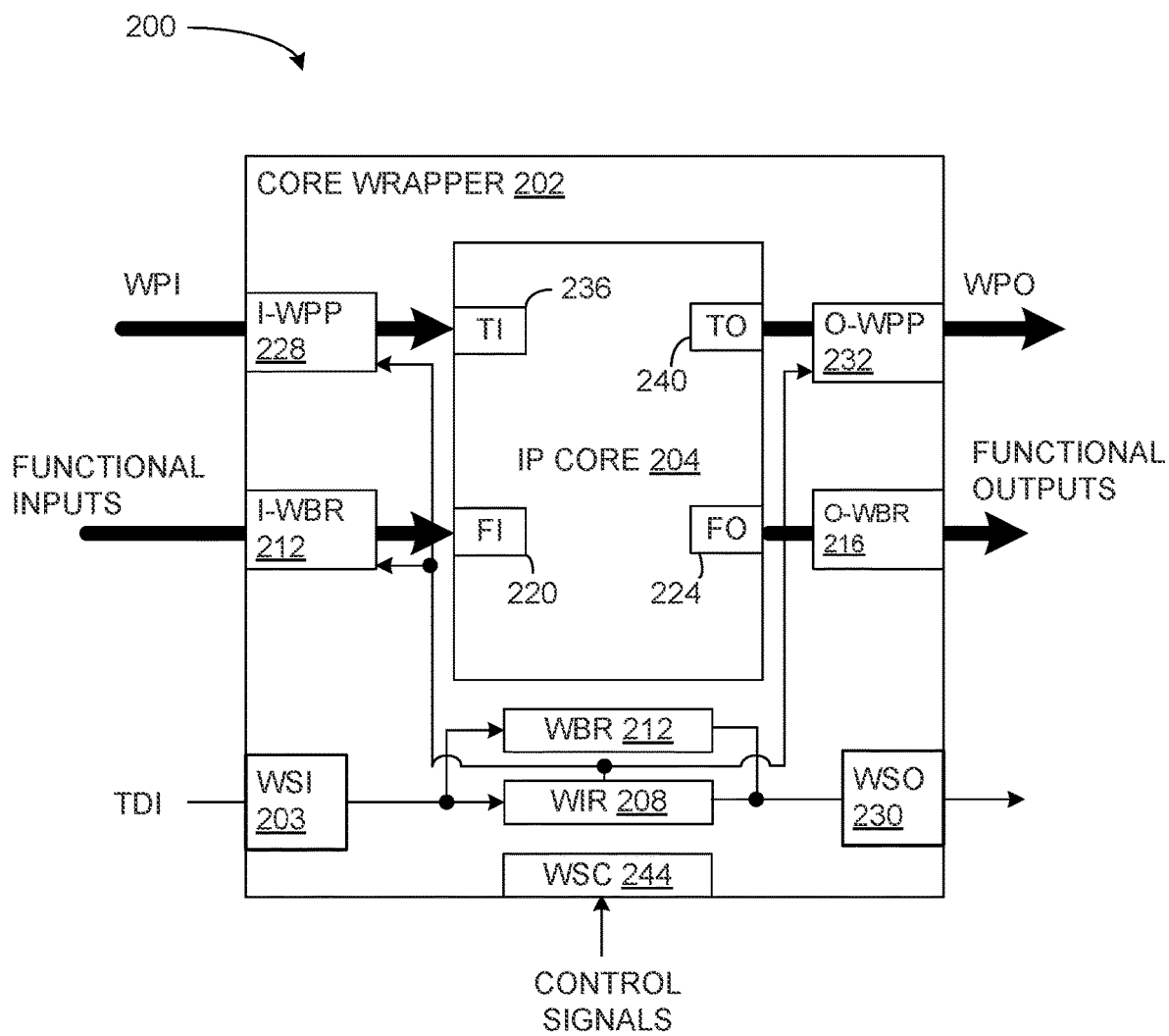
FIG. 2 illustrates a wrapped IP core.

FIG. 2 illustrates additional details of a wrapped core 200 that includes a core wrapper 202 encapsulating an IP core 204. The wrapped core 200 is employable to implement the wrapped core 151 of FIG. 1 such that the core wrapper 202 is employable to implement the core wrapper 150 of FIG. 1. Similarly, the IP core 204 is employable to implement the IP core 146 of FIG. 1. In the example illustrated, it is presumed that the core wrapper 202 complies with the IEEE 1500 standards, but in other examples, another standard core wrapper or a proprietary core wrapper is employable.

The core wrapper 202 includes ports for funneling data signals that are communicated with the IP core 204. Stated differently, input and output signals (e.g., ingress and egress signals) for the IP core 204 pass through a port of the core wrapper 202.

More particularly, the core wrapper 202 receives a test data input (TDI) signal at a WSI port 203. In some examples test data encoded on the TDI signal is arranged serially for testing the IP core 204 or a different IP core (not shown) connected to the IP core 204 in a scan chain. The signal provided to the WSI port 203 is provided to a wrapper instruction register (WIR) port 208 and a wrapper bypass register (WBY) port 212.

The core wrapper 202 includes an I-WBR port 212 and an O-WBR port 216. The I-WBR port 212 receives functional inputs that encode data that triggers an operation of the IP core 204. More particularly, the functional inputs can be provided to a functional input port 220 embedded on the IP core 204. The O-WBR port 216 provides functional outputs that encodes data generated at the IP core 204 in response to the functional inputs. More particularly, the IP core 204 provides the functional outputs on a functional output port 224 embedded with the IP core 204.

In some examples, the core wrapper 202 includes an input wrapper parallel port (I-WPP) 228 and an output wrapper parallel port (O-WPP) 232. The I-WPP 228 receives a wrapper parallel input (WPI) signal that is coupled to a test input port 236 embedded in the IP core 204. The WPI signal encodes test data that elicits a response from the IP core 204. The response to the WPI signal is provided as a wrapper parallel output (WPO) signal at a test output port 240 that traverses the O-WPP 232. In some examples, the I-WPP 228 and the O-WPP 232 are omitted.

The core wrapper 202 includes a WSC port 244 that receives control signals. The control signals embed data (organized serially) to control a mode of operation of the core wrapper 202. More specifically, the core wrapper 202 has three (3) modes of operation, namely, an INTEST (or inward facing) mode, an EXTEST (or outward facing) mode and a wrapper disable mode.

During time intervals where the control signals provided to the WSC port 244 cause the core wrapper 202 to operate in the INTEST mode, the I-WBR port 212 is deactivated, and test data encoded in the TDI signal provided to the WSI port 203 is routed to the I-WBR port 212 (or the I-WPP 228 in some examples). The test data is applied to the IP core 204 and the response to the test data is encoded in a WSO port 230 that is output by the core wrapper 202. In this manner, the INTEST mode enables testing of core logic in the IP core 204 via the core wrapper 202. Additionally, in the INTEST mode, the core wrapper 202 blocks data signals external to the IP core 204 at the I-WBR port 212 (and/or the I-WPP 228). In some examples, the in the INTEST mode, the core wrapper 202 guards the functional output port 224 to prevent access to logic at the IP core 204.

During time intervals where the control signals received at the WSC port 244 cause the core wrapper 202 to operate in the EXTEST mode, the I-WBR port 212 is activated such that data encoded in the TDI signal provided to the WSI port 203 is passed through the wrapper 202 and to the WSO port 230 for output. That is, in the EXTEST mode, the core wrapper 202 is bypassed such that the test data encoded in the TDI signal provided to the WSI port is not applied to the IP core 204. In this manner, the EXTEST mode enables testing of interconnecting wiring (e.g., wiring between the IP core 204 and another IP core). Additionally, in the EXTEST mode, data signals at the output of the IP core 204 (e.g., data at the functional output port 224) are blocked at the O-WBR port 216 (and/or the O-WPP 232 in some examples). Further, in some examples, in the EXTEST mode, the core wrapper 202 guards the functional input port 220 to prevent access to logic at the IP core 204.

During time intervals where the control signals provided to the WSC port 244 cause the core wrapper 202 to operate in the wrapper disable mode, the core wrapper 202 disables wrapper logic to allow full access to the functional input port 220 and the functional output port 224 (presuming that full pin access and control is allowed). Moreover, in the wrapper disable mode, the IP core 204 operates in full functional (e.g., normal) operation.

Thus, as demonstrated, the core wrapper 202 can gate access to the IP core 204 through the control signals provided to the WSC port 208. More particularly, the control signals cause the core wrapper 202 to operate in the INTEST mode, the EXTEST mode or the wrapper disable mode.

Referring back to FIG. 1, a test access port (TAP) 164 coupled upstream from the core wrapper 150 can provide an interface for external systems to provide stimuli to the components an IC chip, such as the virtual IC chip 108 or the fabricated IC chip 142. The TAP 164 can conform to the standards set forth in the IEEE 1149.1 standards. Thus, the TAP 164 is a controller configured to generate the control signals employed to control the core wrapper 150. In some examples, the TAP 164 provides commands in a format set forth in the IEEE 1149.1 boundary scan test standard also known as the Joint Test Action Group (JTAG) protocol. The TAP 164 is alternatively referred to as a TAP module.

As noted, the security engine 138 is configured to augment the IC design 104 with security features to prevent unauthorized access to a fabricated IC chip 142 that is based on the IC design 104. More specifically, the security engine 138 is configured to add a locking mechanism 168 that gates access to the core wrapper 150.

The locking mechanism 168 is logically situated between the TAP 164 and the core wrapper 150, and between the TAP 164 and the core wrapper 150 and external signals, such as signals applied to pins of the virtual IC chip 108 and/or signals from other IP cores (not shown of the virtual IC chip 108). In this manner, the locking mechanism 168 gates access to the TAP 164 and gates access to the core wrapper 150. The locking mechanism 168 includes an RoT lock interface 172 and G number of locking elements 176, where G is an integer greater than or equal to one (1). In the example illustrated, there are four (4) locking elements 176, labeled, LOCK 1 .... LOCK 4. However, in other examples, there could be more or less locking elements 176.

In the example illustrated, the virtual IC chip 108 and the fabricated IC chip 142 are configured to receive a test data input signal that encodes the test data input (TDI) signal that encodes the test data that is applied to the WSI port 154 of the core wrapper 150. The TDI signal is provided to an input of the first locking element 176 (LOCK 1), and the output of the first locking element 176 is coupled to the WSI port 154 of the core wrapper 150. The virtual IC chip 108 and the fabricated IC chip 142 are configured to received a test mode select (TMS) signal that encodes data for controlling a mode of operation of the core wrapper 150. The TMS signal is provided to the input of the second locking element 176 (LOCK 2), and an output of the second locking element 176 is coupled to an input of the TAP 164.

The TDI signal and the TMS signal are provided by the EDA application 134 to an input of the first locking element 176 (LOCK 1). In examples where the virtual IC chip 108 has been fabricated (forming the fabricated IC chip 142), the TDI signal and the TMS signal can be provided from automatic test equipment (ATE) 184.

The TAP 164 outputs a control signal to an input of a third locking element 176 (LOCK 3), and an output of the third locking element 176 is coupled to the WSC port 152 of the core wrapper 150. Further, the output of the WSO port 156 is provided to an input of the fourth locking element 176 (LOCK 4), and an output of the fourth locking element 176 is provided to an input of the TAP 164 (e.g., as feedback). Accordingly, as is illustrated, the G number of locking elements 176 are logically situated to control communication between the TAP 164 and the core wrapper 150, and between external systems and the TAP 164 and the core wrapper 150.

The RoT lock interface 172 (alternatively referred to as a lock interface), is configured to control a state of the locking elements 176 based on the presence or absence of an authentication key 180. In the example illustrated, the security engine 138 provides the authentication key 180 to the RoT lock interface 172, but in other examples, another external entity, such as a RoT can provide the authentication key 180 to the RoT lock interface 172. The RoT lock interface 172 can be implemented as a secure cryptoprocessor, such as a trusted platform module (TPM) a cryptographic processor and memory for storing trusted data and machine executable instructions.

The authentication key 180 represents a digital signature of an RoT or other trusted entity. In response to receipt of the authentication key 180, the RoT lock interface 172 attempts to verify the authenticity of the authentication key 180 to verify the identify of the sender of the authentication key 180. If the RoT lock interface 172 confirms the authenticity of the authentication key 180, the RoT lock interface 172 provides an unlock code stored in a secure internal shift register (or other data storage) of the RoT lock interface 172 to the G number of locking elements 176. In response to the unlock code, the G number of locking elements 176 operate in an unlocked state an pass signals received at an input to an output. Conversely, in situations where the authentication key 180 is not provided to the RoT lock interface 172 and/or the authenticity of the authentication key 180 cannot be verified, the unlock code is not sent from the RoT lock interface 172 to the G number of locking elements 176. If the unlock code is not provided to the G number of locking elements 176, the G number of locking elements 176 operate in a locked state and output a constant value (e.g., a logical 0 or a logical 1) that is independent of a value provided to an input of the corresponding locking element 176.

Figure 3:
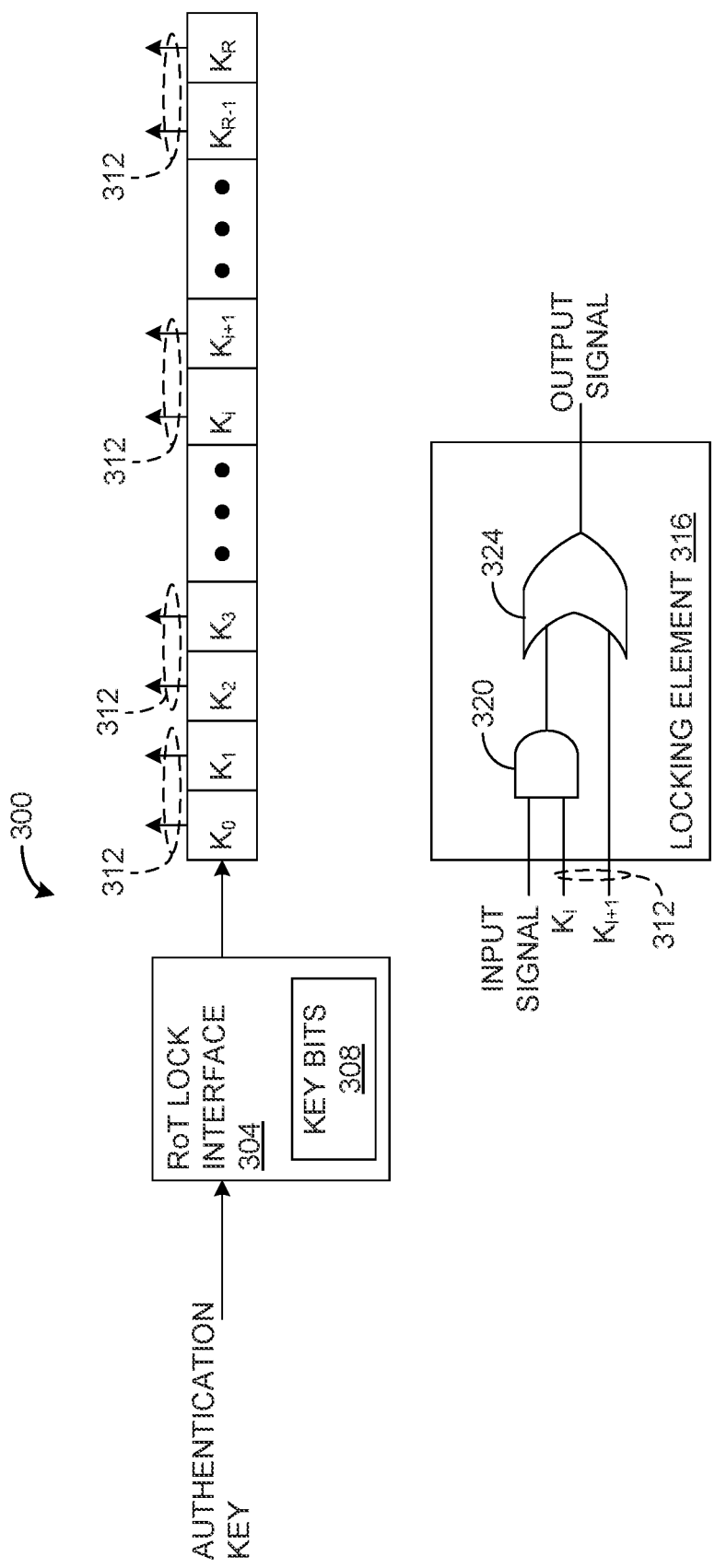
FIG. 3 illustrates an example of a locking mechanism for an IC design.

FIG. 3 illustrates an example of a locking mechanism 300 that is employable to implement the locking mechanism 168 of FIG. 1. The locking mechanism 300 includes an RoT lock interface 304, such as the RoT lock interface 172 of FIG. 1. Thus, the RoT lock interface 304 can be implemented with a secure cryptoprocessor, such as a TPM.

The RoT lock interface 304 is configured receive an authentication key from an external source, such as an RoT. The authentication key can be implemented with the authentication key 180 of FIG. 1, such that the authentication key can be implemented as a digital signature of the RoT. In response to receipt of the authentication key, the RoT lock interface 304 is configured to verify an authenticity of a sender (e.g., the RoT) of the authentication key.

If the verification is successful, the RoT lock interface 304 is configured to output a stream of key bits 308 stored in a secure memory (e.g., a secure internal shift register) of the RoT lock interface 304. The key bits 308 include R number of bits, labeled $K_0 \ldots K_R$ that are patterned to unlock G number of locking elements (e.g., the G number of locking elements 176 of FIG. 1), where R is an integer greater than or equal to two (2).

The R number of bits in the key bits 308 are arranged as P number of bit pairs 312 (e.g., sequential bits), where P is an integer greater than or equal to one and less than R. Each bit pair 312 corresponds to an unlock code that is provided to a locking element 316 (e.g., an instance of the G number of locking elements 176 of FIG. 1). As is illustrated, each bit pair 312 includes a first bit (e.g., bit $K_i$) and a second bit that is a next (e.g., sequential) bit in the key bits 308 (e.g., bit $K_{i+1}$).

Conversely, in situations where the authentication key is not received at the RoT lock interface 304 and/or the authentication key cannot be verified, the RoT lock interface 304 is configured to output a sequence of bits to the locking elements 316 that provide a lock code. The lock code can be any string of bits (e.g., selected pseudo randomly or as a stream of logical 0's or logical 1's) other than the stream of bits encoded in the key bits 308. Accordingly, any code other than the unlock code is equivalent to the lock code.

The locking element 316 illustrated in the locking mechanism 300 receives a bit pair 312, namely bit $K_i$ and bit $K_{i+1}$. The locking element 316 also receives an input signal (e.g., a data signal). The locking element 316 provides an output signal. The input signal is provided to a first input of an AND gate 320 of the locking element 316, and the bit $K_i$ of the bit pair 312 is provided to a second input of the AND gate 320. An output of the AND gate 320 is provided to a first input of an OR gate 324, and the bit $K_{i+1}$ of the bit pair 312 is provided to the second input of the OR gate 324. An output of the OR gate 324 provides the output of the locking element 316. Table 1 characterizes an output of the locking element 316.

TABLE 1

| $K_i$ | $K_{i+1}$ | Lock Element Output |
|---|---|---|
| 0 | 0 | Locked to 0 |
| 0 | 1 | Locked to 1 |
| 1 | 0 | Unlocked-Input signal passed through |
| 1 | 1 | Locked to 1 |

As illustrated in Table 1, the unlock code for the locking element 316 is $K_i=1$ and $K_{i+1}=0$. Thus, as illustrated in Table 1, if the bit pair 312 has any value other than $K_i$ being a logical 1 and $K_{i+1}$ being a logical 0, the output signal of the locking element 316 has a constant (locked) value (e.g., a logical 0 or a logical 1). In this manner, the RoT lock interface 304 and the locking element 316 of the locking mechanism 300 operate in concert to gate access to a port downstream of the locking element 316, such as a port of the core wrapper 150 of FIG. 1.

The arrangement of the logic gates (e.g., the AND gate 320 and the OR gate 324) of the locking element 316 are changeable such that different locking elements (e.g., within the G number of locking elements 176) have different or the same unlock codes.

Referring back to FIG. 1, by employing the system 100, the IC design 104 is augmented with the locking mechanism 168 to prevent unauthorized use of the core wrapper 150. In particular, the RoT lock interface 172 is configured such that in the absence of the authentication key 180 (e.g., the authentication key 180 is not received by the RoT lock interface 172 or an inauthentic key is provided to the RoT lock interface 172), the G number of locking elements 176 block input signals from being passed therethrough. Thus, in the situations where the authentication key 180 is not provided to the RoT lock interface 172, the second locking element 176 blocks the TMS signal from reaching the TAP 164 and the first locking element 176 blocks the TDI signal from reaching the WSI port 154 of the core wrapper 150. Moreover, as noted, the core wrapper 150 operates in the EXTEST mode by default. Thus, functional inputs provided to the I-WBR port 158 are blocked from reaching the IP core 146. Additionally, because test data encoded on the TDI signal would also be blocked from reaching the WSI port 154, the locking mechanism 168 and the core wrapper 150 operate in concert to prevent unauthorized access to the IP core.

Accordingly, the IC design 104 is augmented with the locking mechanism 168, thereby enabling the instantiation of the fabricated IC chip 142. In some examples, the fabricated IC chip 142 is fabricated in an unsecure facility, sometimes referred to as an "untrusted foundry". In such situations, inclusion of the locking mechanism 168 and the core wrapper 150 may curtail IP theft, security information theft, reverse engineering, counterfeiting, etc. because an end-customer that employs the fabricated IC chip 142 would be unable to access the IP core 146 without having access to the authentication key 180 that is controllable by the RoT (or other entity). In this manner, usage of the fabricated IC chip 142 is limited to authorized entities.

Figure 4:
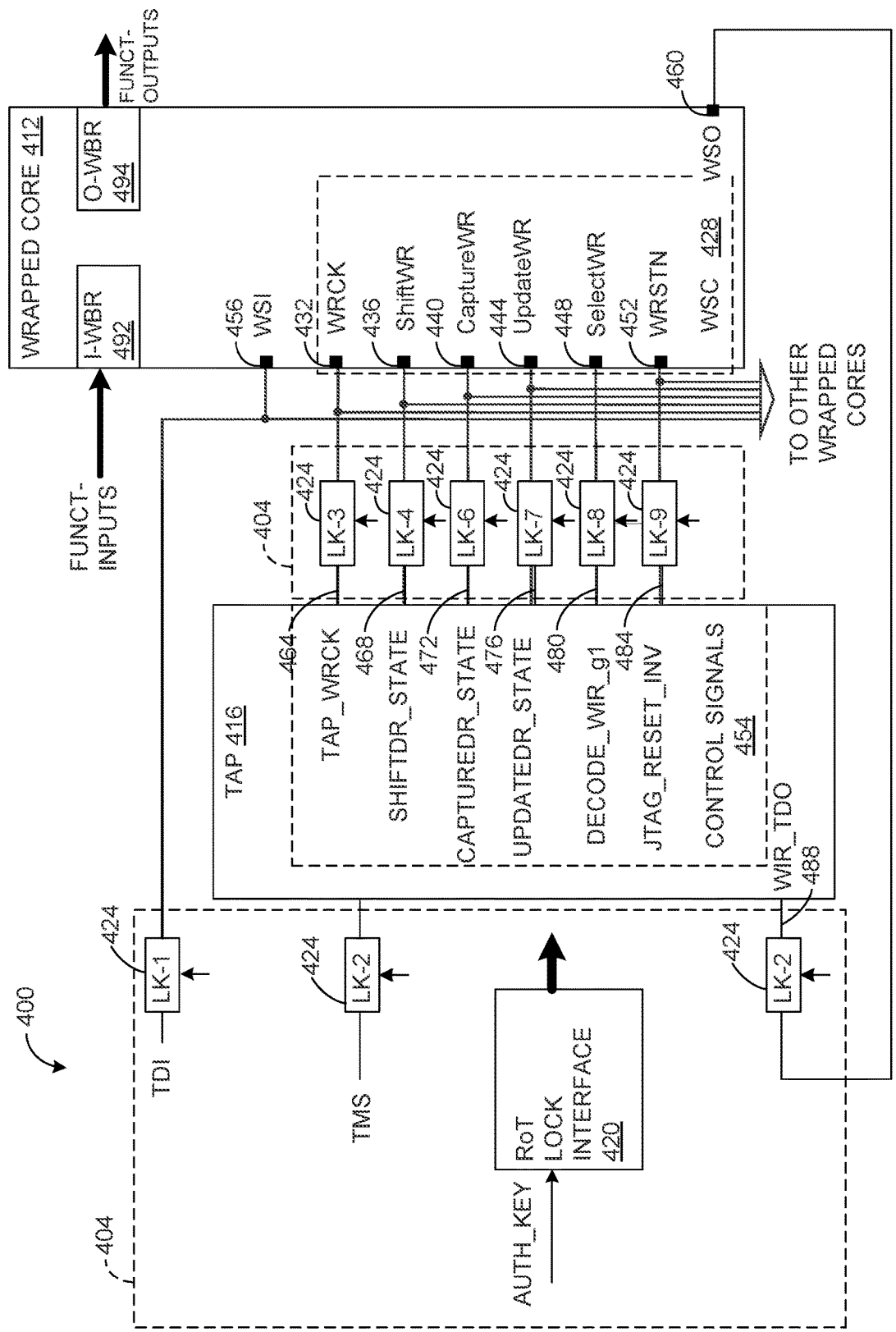
FIG. 4 illustrates a diagram of an IC design with a locking mechanism.

FIG. 4 illustrates an example of a signal level diagram of an IC design 400 that has been augmented with a locking mechanism 404. The IC design 400 can be employed to implement the virtual IC chip 108 and/or the fabricated IC chip 142 of FIG. 1. Similarly, the locking mechanism 404 is employable to implement the locking mechanism 168 of FIG. 1. The IC design 400 includes a wrapped core 412 that is employable to implement the wrapped core 151 of FIG. 1 and/or the wrapped core 200 of FIG. 2. The IC design 400 includes a TAP 416 that is implemented as a JTAG Macro (e.g., a TAP controller) compiling with the IEEE 1149.1 standards. Thus, the TAP 416 is employable to implement the TAP 164 of FIG. 1.

The locking mechanism 404 includes an RoT lock interface 420 an G number of locking elements 424. In the example illustrated, the IC design 400 includes nine (9) locking elements 424 (LK-1 . . . LK-9), but in other examples, there could be more or less locking elements 424. The RoT lock interface 420 is employable to implement the RoT lock interface 172 of FIG. 1 and/or the RoT lock interface 304, such that the RoT lock interface 420 operates as a cryptoprocessor. Similarly, the G number of locking elements 424 are employable to implement the G number of locking elements 176 of FIG. 1, such that each of the G number of locking elements 424 can be implemented with the locking element 316 of FIG. 1.

The RoT lock interface 420 and the G number of locking elements 424 are configured to operate in concert to gate communication between the TAP 416 and the wrapped core 412 and to gate communication between external signals and the TAP 416 and the wrapped core 412. The RoT lock interface 420 is configured to control a state of the G number locking elements 424 based on a presence or an absence of an authentication key (AUTH_KEY). For purposes of clarity in the illustration of FIG. 4, the connections between the RoT lock interface 420 and the locking elements 424 are omitted.

In operation, if the RoT lock interface 420 receives the authentication key (e.g., from an RoT or other entity), the RoT lock interface 420 attempts to authenticate the authentication key. In response to authentication of the authentication key, the RoT lock interface 420 provides an unlock code (e.g., a two bit signal, as illustrated in FIG. 3) to each of the G number of locking elements 424. In response to the unlock code, the G number of locking elements 424 operate in an unlocked state. In the unlocked state, the G number of locking elements 424 operate as a pass through, such that a signal provided to an input of a given locking element 424 is passed to an output of the given locking element.

Conversely, if the RoT lock interface 420 does not authenticate the authentication key (e.g., because the authentication key is not sent or an unauthorized key is provided), the RoT lock interface 420 does not provide the unlock code to the G number the locking elements 424. If the G number of locking elements 424 do not receive the unlock code, the G number of locking elements 424 operate in a locked state. In the locked state, a given locking element 424 outputs a constant value (e.g., a logical 0 or logical 1) that is independent from the value of an input signal at the given locking element 424.

The wrapped core 412 includes a WSC port 428. In FIG. 4, the WSC port 428 is represented as a multi-signal input port. The WSC port 428 is employable to implement the WSC port 152 of FIG. 1 and/or the WSC port 208 of FIG. 2. The signals provided to the WSC port 152 correspond to the control signals described with respect to FIGS. 1 and 2. More particularly, the WSC port 428 includes a wrapper clock (WRCK) port 432, a wrapper shift register (ShiftWR) port 436, a wrapper capture (CaptureWR) port 440, a wrapper update (UpdateWR) port 444, a wrapper select (SelectWR) port 448 and a wrapper reset (WRSTN) port 452. Collectively, the signals (e.g., control signals 454) provided individual ports of the WSC port 428 control a mode of operation of the wrapped core 412. The wrapped core 412 also includes a WSI port 456 that is employable to implement the WSI port 154 of FIG. 1 and a WSO port 460 that is employable to implement the WSO port 156 of FIG. 1. In summary, Table 2 characterizes the operations of the signals at the various ports of the wrapped core 412.

TABLE 2

| PORT | OPERATION | STATE IF LOCKED |
|---|---|---|
| WSI | Wrapper Test Input | 0/1 |
| WRCK | Wrapper Clock | 0 |
| ShiftWR | Enable Serial Shiftting of Wrapper Cells | 0 |
| CaptureWR | Enable Wrapper Cells to Caputre new External Value | 1 |
| UpdateWR | Enables test data registers of IP core to update values | 0 |
| SelectWIR | Slects IP core for testing | 0 |
| WRSTN | Wrapper Reset | 1 |
| WSO | Wrapper Test Output | 0 |

The TAP 416 is configured to provide the control signals 454 to the wrapped core 412 based on a TMS signal. More specifically, the TAP 416 is configured to provide a TAP clock (TAP_WCK) signal 464 to the WRCK port 432, a shifter state (SHIFTER_STATE) signal 468 to the ShiftWR port 436, a capture state (CAPTURER_STATE) signal 472 to the CaptureWR port 440, an update register (UPDATEDR_STATE) signal 476 to the UpdateWR port 444 a selection (DECODE_WIR_g1) signal 480 to the SelectWR port 448 and a TAP reset signal (TAP_REST_INV) signal 484 to the WRSTN port 452. Additionally, the signal output by the WSO port 460 is configured to be provided to the TAP 416 as a wrapper test data output (WIR_TDO) signal 488. Furthermore, although FIG. 4 includes a single wrapped core 412, in other examples, the signals output by the TAP 416 are also configured to be provided to other wrapped cores, as is illustrated.

As noted, the RoT lock interface 420 and the G number of locking elements 424 operate in concert to gate communications between the external signals and the wrapped core 412. More specifically, the first locking element 424 (LK-1) receives a TDI signal at an input and an output of the first locking element 424 is coupled to the WSI port 456 of the wrapped core 412 (and coupled to other WSI ports of other wrapped cores not shown). Similarly, the RoT lock interface 420 and the G number of locking elements 424 operate in concert to gate communications between the external signals and the TAP 416. Specifically, a TMS signal is provided to an input of a second locking element 424 (LK-2), and output of the second locking element 424 is provided to an input of the TAP 416. As state of the control signals 454 output by the TAP 416 is controlled by the TMS signal (if received).

Further, as noted, the RoT lock interface 420 and the G number of locking elements 424 operate in concert to gate communications between the TAP 416 and the wrapped core 412. Specifically, each constituent control signal of the control signals 454 is provided to an input of a corresponding locking element 424, namely the third to ninth locking elements 424 (LK-3 .... LK-9). Additionally, the outputs of the third through locking elements 424 are provided to the ports the WSC port 428, as illustrated and described. Additionally, the WIR_TDO signal provided at the WSO port 460 of the wrapped core 412 is provided to an input of the second locking element (LK-2) 424 and an output of the second locking element 424 is provided to an input of the TAP 416. Accordingly, the second to ninth locking elements 424 (LK2 .... LK-9) are logically situated between the TAP 416 and a core wrapper of the wrapped core 412 to enable the locking mechanism to gate communications between the TAP 416 and the core wrapper of the wrapped core 412.

Accordingly, if the RoT lock interface 420 receives and authenticates the AUTH_KEY, the RoT lock interface 420 send the unlock code to the G number of locking elements 424 causing the G number of locking elements 424 to transition to the unlocked state, and operate as pass-through devices, thereby enabling unfettered communication between the TAP 416, the wrapped core 412 and external signals. Conversely, in situations where the RoT lock interface 420 cannot verify the authenticity of the AUTH_KEY (e.g., because the AUTH_KEY was not received by the RoT lock interface 420 or an inauthentic key is received), the G number of locking elements 424 block data flow between the TAP 416, the wrapped core 412 and the external signals.

The wrapped core 412 includes a I-WBR port 492 that is employable to implement the I-WBR port 212 of FIG. 2. Similarly, the wrapped core 412 also includes an O-WBR port 494 that is employable to implement the O-WBR port 216 of FIG. 1. The I-WBR port 492 is configured to receive functional inputs (FUNCT-INPUTS) and the O-WBR port 494 is configured to provide functional outputs (FUNCT-OUTPUTS).

The control signals 454 embed data (organized serially) to control a mode of operation of the core wrapper of the wrapped core 412. More specifically, the core wrapper of the wrapped core 412 has three (3) states, namely, an INTEST mode, an EXTEST mode and a wrapper disable mode.

During time intervals where the control signals 454 provided to the WSC port 428 cause the core wrapper of the wrapped core 412 to operate in the INTEST mode data encoded in the TDI signal applied to the IP core and the response to the test data is encoded in the TDI signal that is output by the wrapped core 200 at the WSO port 460. In this manner, the INTEST mode enables testing of core logic in the IP core via the core wrapper of the wrapped core 412. Additionally, in the INTEST mode, the core wrapper of the wrapped core 412 blocks the FUNCT-INPUTS at the I-WBR port 492 from reaching the IP core. In some examples, the in the INTEST mode, the core wrapper guards (e.g., with a guard control signal) the I-WBR port 212 to prevent access to logic at the IP core of the wrapped core 412.

During time intervals where the control signals 454 received at the WSC port 428 cause the core wrapper to operate in the EXTEST mode, the TDI signal received at the WSI port 456 is passed through the wrapper 202 and to the WSO port 460. That is, in the EXTEST mode, the wrapped core 412 is bypassed such that the test data encoded in the TDI signal is not applied to the IP core of the wrapped core 412. In this manner the EXTEST mode enables testing of interconnecting wiring (e.g., wiring between the IP core of the wrapped core 412 and another IP core, not shown). Additionally, in the EXTEST mode the FUNCT-OUTPUTS at the I-WBR port 492 are blocked. Further, in some examples, the EXTEST mode, the wrapped core 412 guards (e.g., with the guard control signal) the I-WBR port 494 to prevent access to logic at the IP core.

During time intervals where the control signals provided to the WSC port 428 cause the core wrapper of the wrapped core 412 to operate in the wrapper disable mode, the core wrapper disables wrapper logic to allow data encoded in the FUNCT-INPUTS at the I-WBR port 492 to access the IP core of the wrapped core 412 and the data to be output on the FUNCT-OUTPUTS at the O-WBR port 494 (presuming that full pin access and control is allowed). Moreover, in the wrapper disable mode, the IP core of the wrapped core 412 operates in full functional (e.g., normal) operation.

Each port of the wrapped core 412, including the WSI port 456, the WSO port 460 as well as the WRCK port 432, the CaptureWR port 440, the UpdateWR port 444, the SelectWR port 448, the WRSTN port 452 of the WSC port 428, the I-WBR port 492 and the O-WBR port 494 can be implemented with a wrapper cell. Each such wrapper cell can be integrated with the logic corresponding IP core (referred to as a shared wrapper cell) or can be discrete from the logic of the corresponding IP core (referred to as a dedicated wrapper cell).

Figure 5:
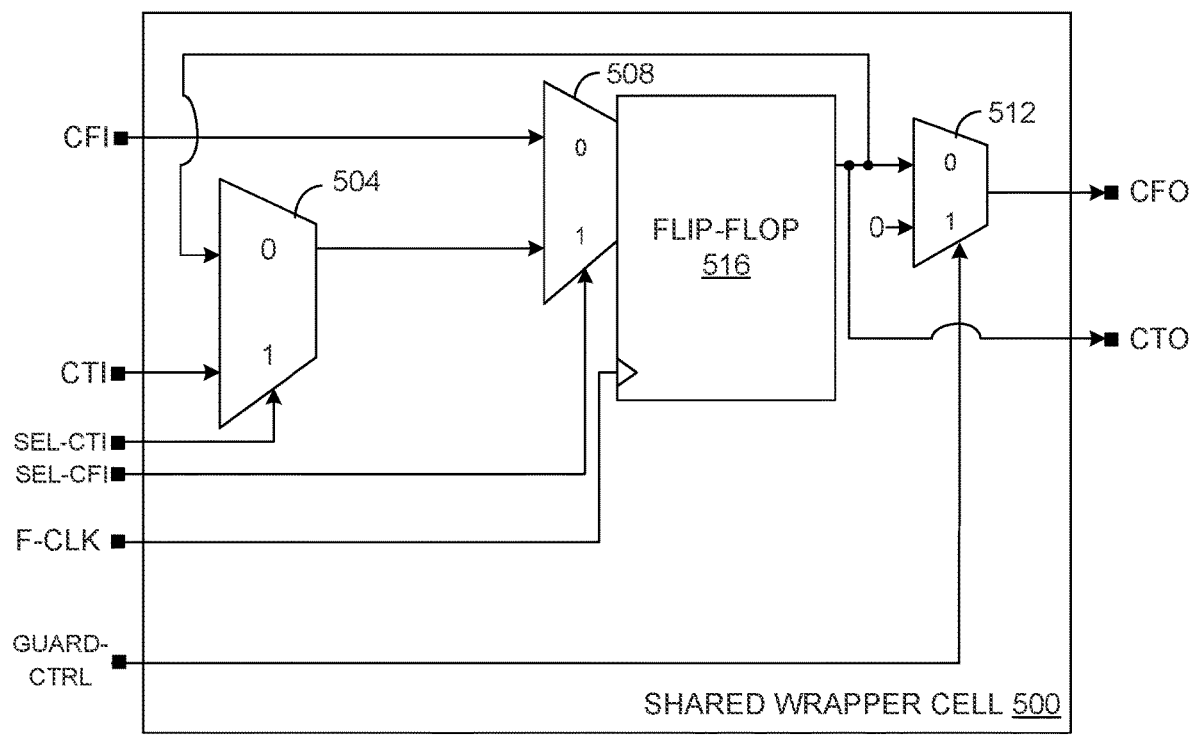
FIG. 5 illustrates an example of a shared wrapper cell for a core wrapper.

FIG. 5 illustrates an example of a shared wrapper cell 500 for a core wrapper that can be integrated with logic of an IP core. The shared wrapper cell 500 is employable to implement the I-WBR port 492 of FIG. 4.

The shared wrapper cell 500 includes a first multiplexer 504, a second multiplexer 508 and a third multiplexer 512. The first multiplexer 504, the second multiplexer 508 and the third multiplexer 512 are 2-to-1 multiplexers. Thus, the first multiplexer 504, the second multiplexer 508 and the third multiplexer 512 have a first input (labeled 0) and a second input (labeled 1). An output of the first multiplexer 504, the second multiplexer 508 and the third multiplexer 512 is selected based on a signal received at a control port (illustrated on a bottom of the first multiplexer 504, the second multiplexer 508 and the third multiplexer 512).

The second input of the first multiplexer 504 is configured to receive a core test input (CTI) signal that has test signals encoded therein (e.g., corresponding to the TSI signal of FIGS. 1-4). The first multiplexer 504 is controlled by a select test input signal (SEL-CTI). The output of the first multiplexer 504 is coupled to the second input of the second multiplexer 508. The first input of the second multiplexer 508 is configured to receive a functional input signal (e.g., corresponding to the functional input signals described with respect to FIGS. 1-3). An output of the second multiplexer 508 is coupled to an input of a flip-flop 516 (e.g., a D input of a D flip-flop). The second multiplexer 508 is controlled by a select functional input (SEL-CFI) signal.

The flip-flop 516 receives a functional clock (F-CLK) signal. Moreover, an output of the flip-flop 516 is provided to a first input of the third multiplexer 512, a first input of the first multiplexer 504 and as a core test output (CTO) for the shared wrapper cell 500. The third multiplexer 512 receives a constant value (e.g., a logical 0 in the illustrated example) at the second input and the third multiplexer 512 is controlled by a guard control signal. The output of the third multiplexer 512 is a core functional output (CFO) signal for the shared wrapper cell 500.

In operation, during intervals of time that a core wrapper employing the shared wrapper cell 500 is operating in the INTEST mode, the GUARD-CTRL signal is asserted (logical 1), and the CFO signal is locked at a logical 0. Additionally, in the INTEST mode, the Select-CTI signal is asserted (e.g., logical 1) by the core wrapper, the Select-CFI signal is asserted (logical 1) by the core wrapper. Additionally, during these intervals of time, test data encoded in the CTI signal is applied to an IP core and output as the CFO signal that is coupled to a port of the IP core for testing.

During intervals of time that the core wrapper employing the shared wrapper cell 500 is operating in the EXTEST mode, the GUARD-CTRL signal is asserted (logical 1) by the core wrapper, and the CFO signal is locked at logical 0. Additionally, in the EXTEST mode, the Select-CTI signal is de-asserted (e.g., logical 1) by the core wrapper, the Select-CFI signal is asserted (logical 1) by the core wrapper. Additionally, during these intervals of time (operating in the EXTEST mode), test data encoded in the CTI signal is blocked from the IP core, and the CTO signal will have a constant value.

During intervals of time that the core wrapper employing the shared wrapper cell 500 is operating in the wrapper disable mode the GUARD-CTRL signal is de-asserted (logical 0) by the core wrapper, and the CFO signal is not a locked value. Additionally, in the wrapper disable mode, the Select-CTI signal is de-asserted (e.g., logical 1) by the core wrapper and the Select-CFI signal is de-asserted (logical 1) by the core wrapper. Additionally, during these intervals of time (operating in the wrapper disable mode), test data encoded in the CTI signal is blocked from the IP core. Instead, data encode in the CFI signal is passed to the CFO signal and applied to the IP core.

Figure 6:
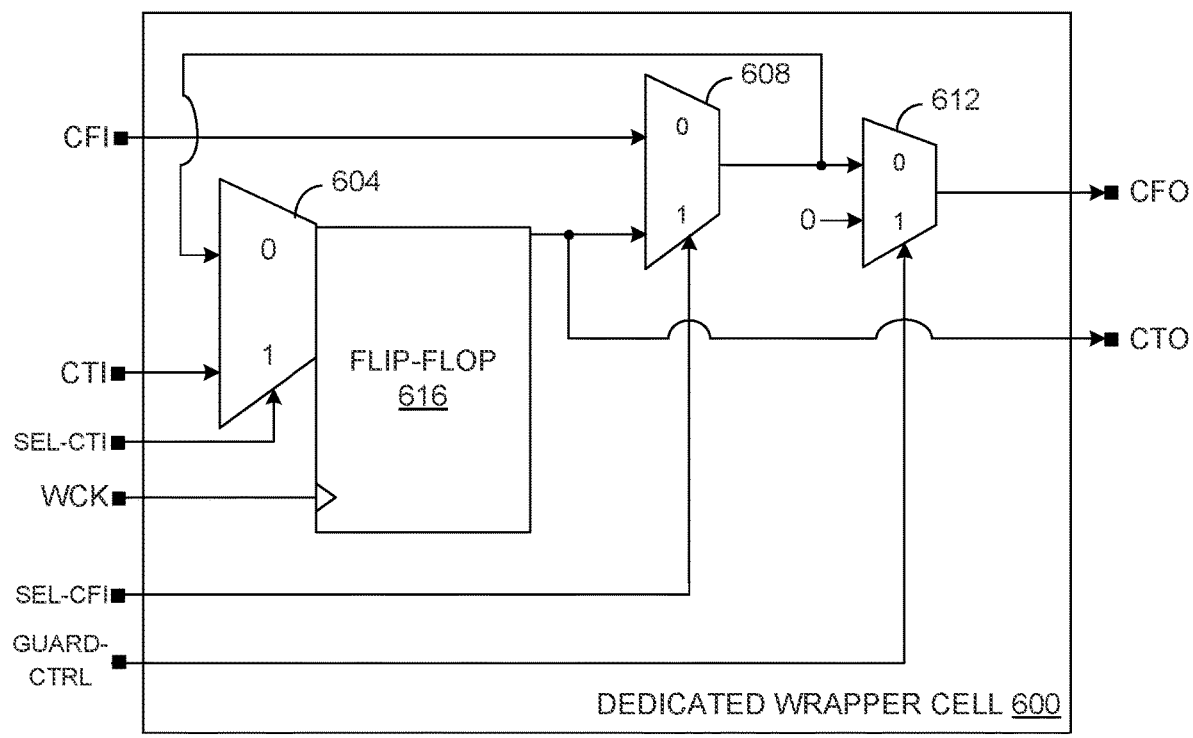
FIG. 6 illustrates an example of a dedicated wrapper cell for a core wrapper.

FIG. 6 illustrates an example of a dedicated wrapper cell 600 for a core wrapper that can alternatively be implemented with logic separate from an IP core. The dedicated wrapper cell 600 complies with standards set forth in the IEEE 1500 standards document. Moreover, the dedicated wrapper cell 600 is employable to implement the I-WBR port 492 of FIG. 4.

The dedicated wrapper cell 600 includes a first multiplexer 604, a second multiplexer 608 and a third multiplexer 612. The first multiplexer 604, the second multiplexer 608 and the third multiplexer 612 are 2-to-1 multiplexers. Thus, the first multiplexer 604, the second multiplexer 608 and the third multiplexer 612 have a first input (labeled 0) and a second input (labeled 1). An output of the first multiplexer 604, the second multiplexer 608 and the third multiplexer 612 is selected based on a signal received at a control port (illustrated on a bottom of the first multiplexer 604, the second multiplexer 608 and the third multiplexer 612).

The second input of the first multiplexer 604 is configured to receive a core test input (CTI) signal that has test signals encoded therein (e.g., corresponding to the TSI signal of FIGS. 1-4). The first multiplexer 604 is controlled by a select test input signal (SEL-CTI). The output of the first multiplexer 604 is coupled to an input (e.g., a D input) of a flip-flop 616. The flip-flop 616 receives a functional clock (F-CLK) signal. The output of the flip-flop 616 provides a core test output (CTO) for the dedicated wrapper cell 600, and the output of the flip-flop 616 is also coupled to the second input of the second multiplexer 608. The first input of the second multiplexer 608 is configured to receive a functional input signal (e.g., corresponding to the FUNCT-INPUTS described with respect to FIG. 4). An output of the second multiplexer 608 is coupled to the first input of the third multiplexer 612. The second multiplexer 608 is controlled by a select functional input (SEL-CFI) signal.

The third multiplexer 612 receives a constant value (e.g., a logical 0 in the illustrated example) at the second input and the third multiplexer 612 is controlled by a guard control signal (GUARD-CTRL). The output of the third multiplexer 612 is a core functional output (CFO) signal for the dedicated wrapper cell 600.

In operation, the dedicated wrapper cell 600 operates similarly to the shared wrapper cell 500 explained with respect to FIG. 5. Thus, during intervals of time that the core wrapper employing the dedicated wrapper cell 600 is operating in the INTEST mode, the GUARD-CTRL signal is asserted (logical 1) by the core wrapper, and the CFO signal is locked at a logical 0. Additionally, in the INTEST mode, the Select-CTI signal is asserted (e.g., logical 1) by the core wrapper and the Select-CFI signal is asserted (logical 1) by the core wrapper. Additionally, during these intervals of time, test data encoded in the CTI signal is applied to an IP core and output as the CFO signal that is coupled to a port of the IP core for testing.

During intervals of time that the core wrapper employing the dedicated wrapper cell 600 is operating in the EXTEST mode, the GUARD-CTRL signal is asserted (logical 1) by the core wrapper, and the CFO signal is locked at logical 0. Additionally, in the EXTEST mode, the Select-CTI signal is de-asserted (e.g., logical 0) and the Select-CFI signal is asserted (e.g., logical 1) by the core wrapper. Additionally, during these intervals of time (operating in the EXTEST mode), test data encoded in the CTI signal is blocked from the IP core, and the CTO signal will have a constant value.

During intervals of time that the core wrapper employing the dedicated wrapper cell 600 is operating in the wrapper disable mode the GUARD-CTRL signal is de-asserted (logical 0), and the CFO signal is not a locked value. Additionally, in the wrapper disable mode, the Select-CTI signal is de-asserted (e.g., logical 0) by the core wrapper and the Select-CFI signal is de-asserted (logical 0) by the core wrapper. Additionally, during these intervals of time (operating in the wrapper disable mode), test data encoded in the CTI signal is blocked from IP core. Instead, data encode in the CFI signal is passed to the CFO signal and applied to the IP core.

Referring back to FIG. 4, as demonstrated, by including the locking mechanism 404 and the core wrapper of the wrapped core 412, unauthorized access to the IP core of the wrapped core 412 is curtailed. More particularly, in the example provided, it is presumed that as a default, the core wrapper of the wrapped core 412 operates in the EXTEST mode. That is, unless the control signals 454 provided to the WSC port 428 indicate otherwise, the core wrapper of the wrapped core 412 blocks functional input signals at the I-WBR port 492 from reaching the IP core of the wrapped core 412. Additionally, the core wrapper forwards test data applied at the WSI port 456 to the WSO port 460.

In situations where the IC design 400 is fabricated to form an IC chip, such as the fabricated IC chip 142 of FIG. 1, the wrapped core 412 is only usable by authorized entities. In this manner, a designer (e.g., a business) of the IC design 400 maintains operational control of the resultant fabricated IC chip even in situations where the fabricated IC chip is distributed without the consent of the designer.

Figure 7:
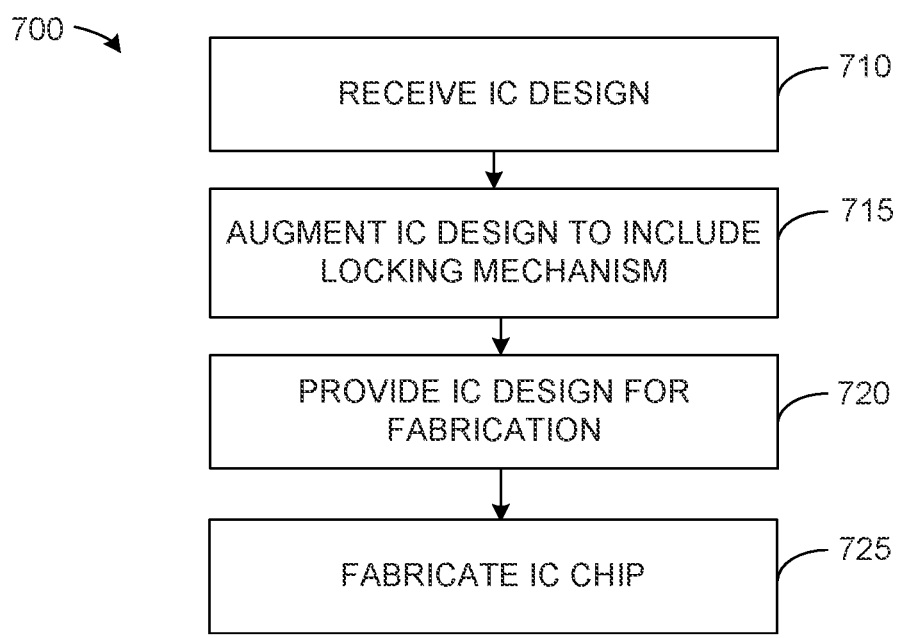
FIG. 7 illustrates a flowchart of an example method for augmenting an IC design to include a locking mechanism.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates an example method 700 for fabricating an IC chip based on an IC design that includes a locking mechanism. The method 700 can be implemented in part with the system 100 of FIG. 1.

At 710, a security engine (e.g., the security engine 138 of FIG. 1) executing on a computing platform (e.g., the computing platform 112 of FIG. 1) receives the IC design. The IC design includes a core wrapper logically encapsulating an IP core such that inputs and outputs to the IP core are funneled through ports of the core wrapper. The IC design includes a TAP module that provides control signals for controlling a mode of operation of the core wrapper. At 715, the security engine augments the IC design with a locking mechanism for controlling communications with the core wrapper. The locking mechanism (e.g., the locking mechanism 168 of FIG. 1) includes a set of locking elements (e.g., the G number of locking elements 176 of FIG. 1) that gate access to the ports of the wrapper and to ports of the TAP module. The locking mechanism also includes an RoT lock interface (e.g., the RoT lock interface 172 of FIG. 1) that controls a state of the set of locking elements based on a presence or absence of an authentication key.

At 720, the IC design (augmented with the locking mechanism) is provided to a foundry for fabrication. At 725, the foundry fabricates the IC chip to provide a fabricated IC chip (e.g., the fabricated IC chip 142 of FIG. 1).

Figure 8:
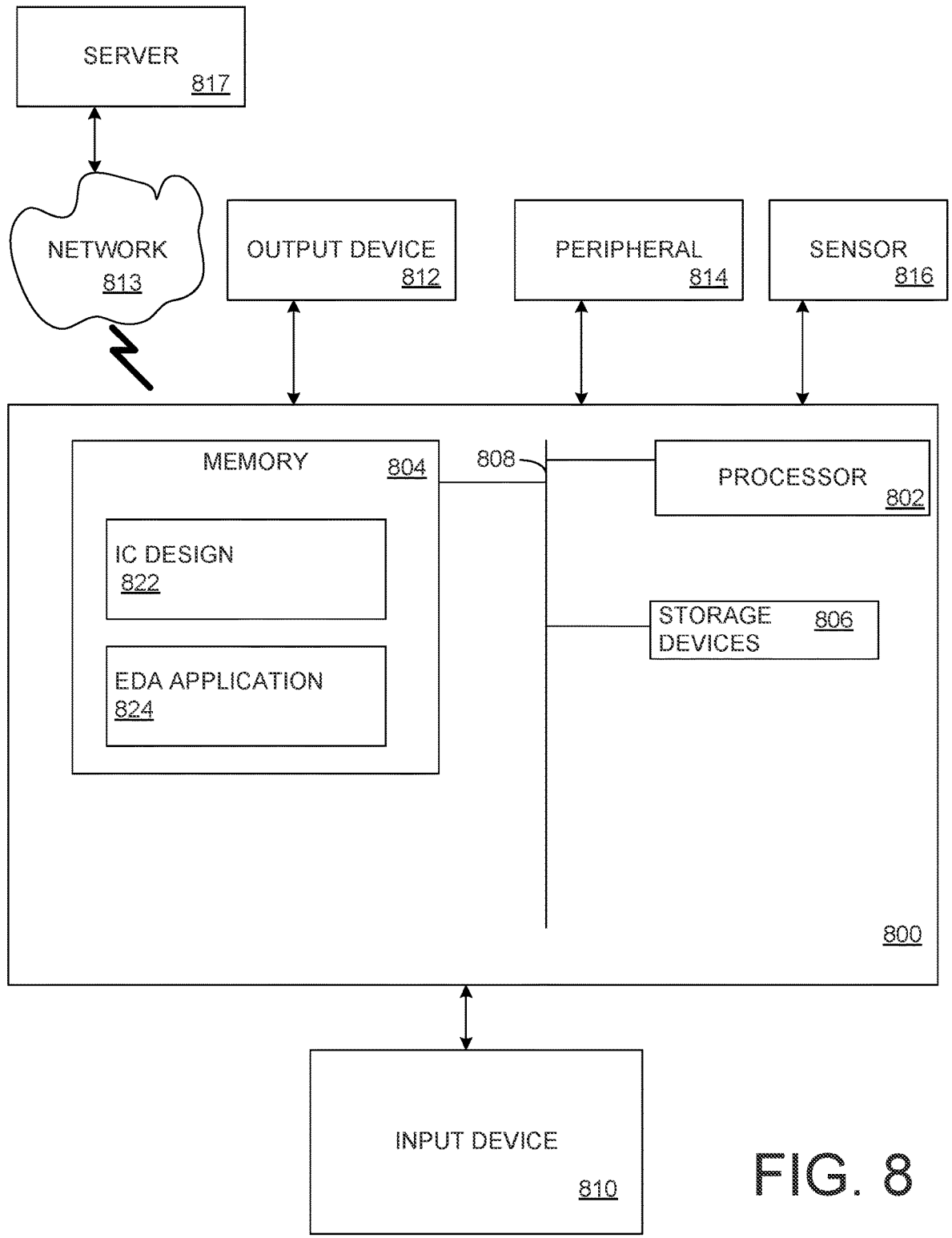
FIG. 8 illustrates an example of a computing system employable to augment an IC design.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 8, the computing system 800 can include a computer processor 802, associated memory 804 (e.g., RAM), cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an IC chip for processing instructions. For example, the computer processor may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 810 can be implemented as separate physical devices. The computing system 800 can be connected to a network 813 (e.g., LAN, a wide area network (WAN) such as the Internet, a mobile network, or any other type of network) via a network interface connection (not shown). The input device 810 and output device(s) 812 can be connected locally and/or remotely (e.g., via the network 813) to the computer processor 802, the memory 804 and/or the storage devices 806. Many different types of computing systems exist, and the aforementioned input device 810 and the output device 812 can take other forms. The computing system 800 can further include a peripheral 814 and a sensor 816 for interacting with the environment of the computing system 800 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 817 via the network 813.

The memory 804 can include an IC design 822 that is instantiated as a virtual IC chip operating on a platform provided by an EDA application 824 or as a fabricated IC chip. The EDA application 824 is employable to augment the IC chip design 822 with a locking mechanism to control communications within the corresponding virtual IC chip and the fabricated IC chip.

Further, one or more elements of the aforementioned computing system 800 can be located at a remote location and connected to the other elements over a network 813 (e.g., in a computing cloud). Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on "means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. An integrated circuit (IC) chip comprising:
    an intellectual property (IP) core that executes logical operations to perform a function;
    a core wrapper logically encapsulating the IP core such that inputs and outputs to the IP core are funneled through ports of the core wrapper; and
    a locking mechanism for controlling communications with the core wrapper, the locking mechanism comprising:
        a set of locking elements that gate access to the ports of the wrapper; and
        a lock interface that controls a state of the set of locking elements based on a presence or absence of an authentication key.

2. The IC chip of claim 1, wherein the authentication key is provided from an external source.

3. The IC chip of claim 1, wherein the lock interface provides each lock in the set of locking elements with a code to set the state of each of the set of locking elements based on the presence or absence of the authentication key.

4. The IC chip of claim 3, wherein the lock interface comprises a cryptoprocessor that stores an unlock code for each of the set of locking elements in an internal register.

5. The IC chip of claim 3, wherein in an unlocked state, each locking element in the set of locking elements operates as a signal pass through.

6. The IC chip of claim 5, wherein in a locked state, each locking element in the set of locking elements outputs a constant logical value that is independent of a value applied to an input of each respective locking element.

7. The IC chip of claim 1, further comprising a test access port (TAP) module that generates control signals for the core wrapper, wherein the control signals are provided to an input of a subset of the locking elements and an output of the subset of the locking elements is coupled to a wrapper serial control port of the core wrapper, the control signals control a mode of operation of the core wrapper and a subset of the set of locking elements are logically situated between the TAP module and the core wrapper to enable the locking mechanism to gate communications between the TAP module and the core wrapper.

8. The IC chip of claim 7, wherein in a first mode of operation, the core wrapper routes test input signals received at a wrapper serial input port of the wrapper core to the IP core and responses to the test input signals are output at a wrapper serial output port of the core wrapper.

9. The IC chip of claim 8, wherein in a second mode of operation, the core wrapper routes test input signals received at the wrapper serial input port of the wrapper core to the wrapper serial output port of the core wrapper and bypasses the IP core.

10. The IC chip of claim 9, wherein in a third mode of operation, the core wrapper routes functional input signals received at an input register of the wrapper core to the IP core and responses to the functional input ports to an output register of the core wrapper.

11. The IC chip of claim 10, wherein the core wrapper operates in the second mode by default, such that in the absence of the control signals, access to the IP core is blocked.

12. The IC chip of claim 11, wherein the test input signals are generated external to the IC chip, and the test input signals are provided to an input of a given locking element of the set of locking elements and an output of the given locking element is coupled to the wrapper serial input port of the core wrapper.

13. The IC chip of claim 12, wherein the output of the wrapper serial output port is provided to an input of another locking element of the set of locking elements and an output of the other locking element is coupled to an input of the TAP module.

14. A system comprising:
a non-transitory memory that stores machine-readable instructions; and
a processing unit that accesses the memory and executes the machine-readable instructions, the machine-readable instructions comprising a security engine that:
augments an integrated circuit (IC) chip design with a locking mechanism for fabrication, such that the IC chip design comprises:
a core wrapper logically encapsulating an intellectual property (IP) core such that inputs and outputs to the IP core are funneled through ports of the core wrapper; and
the locking mechanism for controlling communications with the core wrapper, the locking mechanism comprising:
a set of locking elements that gate access to the ports of the core wrapper; and
a lock interface that controls a state of the set of locking elements based on a presence or absence of an authentication key.

15. The system of claim 14, wherein the authentication key is provided from an external source.

16. The system of claim 14, wherein the lock interface provides each locking element in the set of locking elements with a code to set the state of each of the set of locking elements based on the presence or absence of the authentication key.

17. The system of claim 16, wherein the lock interface comprises a cryptoprocessor that stores an unlock code for each of the set of locking elements in an internal register.

18. The system of claim 16, wherein in an unlocked state, each locking element in the set of locking elements operates as a signal pass through and in a locked state, each locking element in the set of locking elements outputs a constant logical value that is independent of a value applied to an input of each respective locking element.

19. A method for securing an integrated circuit (IC) design for fabrication, the method being implemented by a security engine executing on a computing platform, the method comprising:
receiving the IC design, wherein the IC design comprises:
a core wrapper logically encapsulating an intellectual property (IP) core such that inputs and outputs to the IP core are funneled through ports of the core wrapper; and
a test access port (TAP) module that provides control signals for controlling a state of the core wrapper; and
augmenting the IC design with a locking mechanism for controlling communications with the core wrapper and the TAP module, the locking mechanism comprising:
a set of locking elements that gate access to the ports of the wrapper and to ports of the TAP module; and
a lock interface that controls a state of the set of locking elements based on a presence or absence of an authentication key.

20. The method of claim 19, wherein the lock interface comprises a cryptoprocessor that stores an unlock code for each of the set of locking elements in an internal register.

* * * * *